United States Patent
Laird et al.

(10) Patent No.: US 11,248,958 B2
(45) Date of Patent: Feb. 15, 2022

(54) ATR SPECTROMETER AND METHOD FOR ANALYSING THE CHEMICAL COMPOSITION OF A SAMPLE

(71) Applicant: PYREOS LTD., Edinburgh (GB)

(72) Inventors: Ron Laird, North Lanarkshire (GB); Andrew Wallace, North Yorkshire (GB); Jeremy Murray, Edinburgh (GB); Hugo Vargas Llanas, Edinburgh (GB)

(73) Assignee: PYREOS LTD., Edinburgh (GB)

( * ) Notice: Subject to any disclaimer, the term of this patent is extended or adjusted under 35 U.S.C. 154(b) by 197 days.

(21) Appl. No.: 16/491,068

(22) PCT Filed: Mar. 5, 2018

(86) PCT No.: PCT/EP2018/055319
§ 371 (c)(1),
(2) Date: Sep. 4, 2019

(87) PCT Pub. No.: WO2018/162398
PCT Pub. Date: Sep. 13, 2018

(65) Prior Publication Data
US 2020/0011735 A1    Jan. 9, 2020

(30) Foreign Application Priority Data
Mar. 8, 2017    (DE) .................. 102017104872.3

(51) Int. Cl.
*G01J 3/28*    (2006.01)
*G01J 3/42*    (2006.01)
*G01N 21/25*    (2006.01)
*G01N 21/552*  (2014.01)
*G01N 21/35*   (2014.01)
*G01J 3/02*    (2006.01)

(52) U.S. Cl.
CPC ............... *G01J 3/2803* (2013.01); *G01J 3/42* (2013.01); *G01N 21/25* (2013.01); *G01N 21/35* (2013.01); *G01N 21/552* (2013.01); *G01J 3/0205* (2013.01)

(58) Field of Classification Search
CPC .......... G01J 3/2803; G01J 3/42; G01J 3/0205; G01N 21/25; G01N 21/35; G01N 21/552
See application file for complete search history.

(56) References Cited

U.S. PATENT DOCUMENTS

| 5,920,069 A | 7/1999 | Fischer et al. |
| 2003/0176775 A1 | 9/2003 | Berman |

(Continued)

FOREIGN PATENT DOCUMENTS

| DE | 102009027134 A1 * | 12/2010 | ......... G01N 21/3504 |
| DE | 102013005372 A1 | 10/2014 | |

(Continued)

OTHER PUBLICATIONS

Kaess et al.—DE 10 2009 027 134 A1—Google Patent English obtained May 26, 2021 (Year: 2021).*

(Continued)

*Primary Examiner* — David P Porta
*Assistant Examiner* — Jeremy S Valentiner
(74) *Attorney, Agent, or Firm* — Thompson Coburn LLP

(57) ABSTRACT

The invention relates to an ATR spectrometer for analysing the chemical composition of a sample, wherein the ATR spectrometer (1) comprises an ATR crystal (2), at least one infrared light source (5) being arranged on the entry surface (3), a line array (6) of infrared light detectors, at least one single infrared light detector (7), wherein the at least one infrared light source (5) is adapted to emit infrared light that enters the ATR crystal and is guided to the infrared light detectors under total internal reflection and under interaction (Continued)

Figure 1:
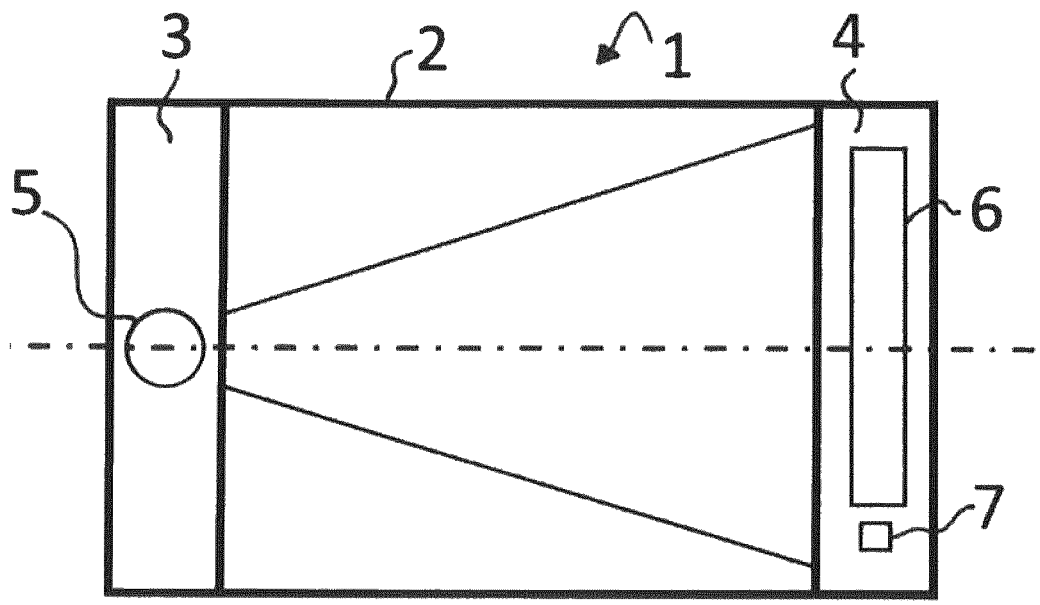

with the sample being arranged immediately adjacent to the ATR crystal, a wavelength dispersive element (8) being arranged in the path of the infrared light so—that the line array is adapted to measure a spectrum of the infrared light, and a wavelength filter (9) being arranged in the path of the infrared light to the single infrared light detector, wherein at least one of the infrared light detectors is chosen to be a chosen infrared light detector for a signal correction, and the ATR spectrometer is adapted to use the electrical signal of the chosen infrared light detectors to correct the electrical signals of all the other infrared light detectors.

15 Claims, 3 Drawing Sheets

(56) References Cited

U.S. PATENT DOCUMENTS

| 2013/0275052 A1 | 10/2013 | Loder et al. |
| 2016/0238522 A1 | 8/2016 | Lednev |
| 2016/0299006 A1 | 10/2016 | Giebeler et al. |
| 2017/0010160 A1 * | 1/2017 | Rosen ........................ G01J 3/26 |
| 2017/0215796 A1 | 8/2017 | Giebeler et al. |
| 2018/0231684 A1 * | 8/2018 | Jones ................... G01N 21/552 |

FOREIGN PATENT DOCUMENTS

| GB | 2530098 A | 3/2016 | |
| JP | S59-171837 A | 9/1984 | |
| JP | 2005-156243 A | 6/2005 | |
| JP | 2008-197043 A | 8/2008 | |
| WO | WO-2015090891 A * | 6/2015 | ................ G01J 3/42 |
| WO | 2016022283 A1 | 2/2016 | |
| WO | WO-2016062863 A1 * | 4/2016 | ............. A61B 5/681 |

OTHER PUBLICATIONS

Kim Dong Soo et al. "Development of an ultra-compact mid-infrared attenuated total reflectance spectrophotometer"—Optical Engineering, Soc. of Photo-Optical Instrumentation Engineers, vol. 53, No. 7, Jul. 2014, p. 74108.

International Search Report and Written Opinion for PCT/EP2018/055319 dated Jun. 26, 2018.

* cited by examiner

ATR SPECTROMETER AND METHOD FOR ANALYSING THE CHEMICAL COMPOSITION OF A SAMPLE

CROSS-REFERENCE AND PRIORITY CLAIM TO RELATED APPLICATIONS

This application is a national stage application of International Patent Application No. PCT/EP2018/055319, filed on Mar. 5, 2018 and published as WO2018/162398, which claims priority to German Patent Application No. 102017104872.3, filed Mar. 8, 2017.

The invention relates to an ATR spectrometer for analysing the chemical composition of a sample and a method for analysing the chemical composition of a sample by means of the ATR spectrometer.

A chemical composition of a sample can be analysed by means of infrared spectroscopy. The infrared spectroscopy can be performed by means of an extinction spectrometer in which the sample is irradiated by broadband infrared light emitted by an infrared light source and an extinction spectrum of the sample is measured after the infrared light has passed through the sample. Alternatively, the infrared spectroscopy can be performed by means of an ATR spectrometer, in which an evanescent wave of the infrared light generated in the sample that is in contact with an ATR crystal of the ATR spectrometer interacts with the sample and an ATR spectrum is measured after the interaction. Both the extinction spectrum and the ATR spectrum comprise a wavelength dependent measurement of the extinction of the sample, i.e. a measurement of the attenuation of the light after interaction with the sample. The extinction comprises an absorption component and a scattering component, i.e. $extinction(\lambda)=absorption(\lambda)+scattering(\lambda)$, wherein $\lambda$ is the wavelength, $extinction(\lambda)$ is the extinction spectrum, $absorption(\lambda)$ is the absorption component of the extinction spectrum and $scattering(\lambda)$ is the scattering component of the extinction spectrum. For analysing the chemical composition of the sample usually only the absorption is considered.

The ATR spectrometer is advantageous in comparison to the extinction spectrometer if the sample contains water, since the peak related to water is less prominent in the ATR spectrum than in the extinction spectrum, whereby the peak related to water covers less other peaks in the ATR spectrum than in the extinction spectrum.

However, if the intensity of the infrared light emitted by the infrared light source is temporally fluctuating, this results also in fluctuating intensities in the ATR spectra thereby also reducing their quality. Furthermore, the ATR crystal and a linear variable filter for passing different portions of the infrared light for measuring the extinction spectra may have limited dimensions which results also in a limited space for arranging detectors of the ATR spectrometer. This limited space for the detectors results either in a low spectral resolution for the ATR spectra or the ATR spectra can only be measured in a narrow spectral range. This also reduces the quality of the ATR spectra.

It is therefore an object of the invention to provide an ATR spectrometer and a method for operating the ATR spectrometer, wherein ATR spectra can be measured with a high quality.

The ATR spectrometer for analysing the chemical composition of a sample according to the invention comprises an ATR crystal having an entry surface being immediately arranged on an entry end of the ATR crystal and an exit surface being immediately arranged on an exit end of the ATR crystal which is arranged opposite to the entry end, at least one infrared light source being arranged on the entry surface, a line array of infrared light detectors being arranged on the exit surface, at least one single infrared light detector being arranged on the exit surface, wherein the at least one infrared light source is adapted to emit infrared light that enters the ATR crystal via the entry surface and is guided to the infrared light detectors under total internal reflection and under interaction with the sample being arranged immediately adjacent to the ATR crystal, a wavelength dispersive element being arranged in the path of the infrared light from the exit surface to the line array so that the line array is adapted to measure a spectrum of the infrared light, and a wavelength filter being arranged in the path of the infrared light from the exit surface to the single infrared light detector, wherein the infrared light detectors are adapted to output an electrical signal being indicative of the amount of the infrared light impinging on the respective infrared light detector, at least one of the infrared light detectors is chosen to be a chosen infrared light detector for a signal correction, and the ATR spectrometer is adapted to use the electrical signal of the chosen infrared light detectors to correct the electrical signals of all the other infrared light detectors.

Due to the correction of all the other infrared light detectors with the chosen infrared light detectors it is advantageously achieved that fluctuations of the at least one infrared light source can be compensated and ATR spectra can therefore be measured with a high quality. Due to the use of the line array and the at least one single infrared light detector there is a huge flexibility on the choice of the wavelength region for the chosen infrared light detectors and on the choice of the wavelength region for measuring the ATR spectra by choosing the wavelength characteristics of the wavelength dispersive element, the infrared light detector in the line array and/or the wavelength characteristics of the wavelength filter of the at least one single infrared light detector. This huge flexibility can be obtained despite the limited available space for arranging the infrared light detectors. Due to this huge flexibility of the choice for the wavelength regions, it is possible to adapt these wavelength regions to the optical properties of the sample and therefore to further increase the quality of the ATR spectra.

It is preferred that the infrared light is guided from the exit surface without a redirection to the infrared light detectors. This results advantageously in a simple design of the ATR spectrometer.

It is preferred that the sample is arranged immediately adjacent to the ATR crystal and the chosen infrared light detector is chosen such that its corresponding detectable wavelength range is in a wavelength region where the sample has substantially no absorption. In this manner, temporal fluctuations of the intensity of the at least one infrared light source can be particularly well compensated, whereby the quality of the ATR spectra can be further increased.

It is preferred that each of the single infrared detectors has a larger photoactive surface than each of the infrared light detectors of the line array. Therefore, the single infrared light detectors have a higher signal-to-noise ratio than the infrared light detectors of the line array. In case one of the single infrared light detectors is used to measure a part of the ATR spectrum, this part can be advantageously measured with a high signal-to-noise ratio. Also it is possible to quantitatively measure a certain component of the ATR spectrum. In case one of the single infrared light detectors is one of the chosen infrared light detector for the signal correction, the signal correction can be carried out with a high precision due to the high signal-to-noise ratio. In both cases, the large photoactive surface of the single infrared light detectors results in an increased quality of the ATR spectra.

The wavelength filter being arranged in the path of the infrared light from the exit surface to the single infrared light detector is preferably a bandpass filter. The spectral resolution for at least one of the single infrared light detectors is preferably higher than for all of the infrared light detectors of the line array. In case this single infrared light detector is used for measuring a part of the ATR spectrum, a peak of the ATR spectrum might be resolved that cannot be made visible by the line array due to the lower spectral resolution of the line array. In case that this single infrared light detector is one of the chosen infrared light detectors for the signal correction, the signal correction can be carried out with a higher precision than it is possible with one of the infrared light detectors of the line array due to their lower spectral resolution. In both cases, the large high spectral resolution of the single infrared light detector results in an increased quality of the ATR spectra.

It is preferred that the chosen infrared light detectors are wired with all the other infrared light detectors such that during operation of the ATR spectrometer the electrical signals output by the chosen infrared light detectors are subtracted from the electrical signals output by all the other infrared light detectors. In this manner, the ATR spectrometer is adapted to correct the electrical signals before they are amplified and/or digitized. Also, the correction of the electrical signals is carried out by a hardware rather than by a software which results in an accelerated data processing. Due to the accelerated data processing it is possible to measure ATR spectra with a higher repetition rate. The higher repetition rate allows for more averaging of the ATR spectra which results in an increased quality for the ATR spectra.

The correction can for example comprise a subtraction of the signal value output by the chosen infrared light detectors from the signal values of all the other infrared light detectors. Alternatively, the correction can comprise a subtraction of the inverse of the signal value output by the chosen infrared light detectors from the inverse of the signal values of all the other infrared light detectors. For both alternatives, the ATR spectrometer is preferably adapted to use the electrical signal of a plurality of the chosen infrared light detectors to generate a wavelength dependent function and to correct the electrical signals of all the other infrared light detectors using the wavelength dependent function. For the case that the signal values are subtracted, the wavelength dependent function is generated by fitting the wavelength dependent function to the signal values output by the chosen infrared light detectors and the wavelength dependent function is subtracted from the signal values output by all the other infrared light detectors. For the case that the inverse of the signal values are subtracted, the wavelength dependent function is generated by fitting the wavelength dependent function to the inverse of the signal values output by the chosen infrared light detectors and the wavelength dependent function is subtracted from the inverse of the signal values output by all the other infrared light detectors. It is thereby possible to correct not only variations in intensity fluctuations of the infrared light source but also spectral drifts of the infrared light source. This further increases the quality of the ATR spectra.

It is preferred that at least one of the chosen infrared light detectors is one of the infrared light detectors of the line array and at least one of the chosen infrared light detectors is one of the single infrared light detectors, wherein the wavelength filter corresponding to the at least one of the chosen infrared light detectors has a transmission in a wavelength region that is outside of the spectrum that can be measured by the line array. In this manner a broad spectral range can be covered by the chosen infrared light detectors and it is therefore possible to correct spectral shifts with a small dependence on the wavelength with a particular high precision. In case the detectable wavelength ranges corresponding to the chosen infrared light detectors are in the wavelength region where the sample has substantially no absorption, the effect of scattering of the sample can be particularly well corrected since the scattering has a smaller dependence on the wavelength.

The method for analysing the chemical composition of a sample according to the invention comprises the steps: a) providing an ATR spectrometer comprising an ATR crystal having an entry surface being immediately arranged on an entry end of the ATR crystal and an exit surface being immediately arranged on an exit end of the ATR crystal which is arranged opposite to the entry end, at least one infrared light source being arranged on the entry surface, a line array of infrared light detectors being arranged on the exit surface, at least one single infrared light detector being arranged on the exit surface, wherein the at least one infrared light source is adapted to emit infrared light that enters the ATR crystal via the entry surface and is guided to the infrared light detectors under total internal reflection and under interaction with the sample being arranged immediately adjacent to the ATR crystal, a wavelength dispersive element being arranged in the path of the infrared light from the exit surface to the line array so that the line array is adapted to measure a spectrum of the infrared light, and a wavelength filter being arranged in the path of the infrared light from the exit surface to the single infrared light detector; b) choosing at least one of the infrared light detectors to be a chosen infrared light detector such that its corresponding detectable wavelength range is in a wavelength region where the sample has substantially no absorption; c) arranging the sample immediately adjacent to the ATR crystal, i.e. contacting the sample with a surface of the ATR crystal; d) emitting the infrared light by means of the at least one infrared light source; e) outputting a respective electrical signal by means of each of the infrared light detectors, wherein each of the electrical signals is indicative of the amount of the infrared light impinging on the respective infrared light detector; f) correcting with the electrical signal of the chosen infrared light detectors the electrical signals of all the other infrared light detectors.

In step f) the signal value output by the chosen infrared light detectors can be subtracted from the signal values of all the other infrared light detectors. Alternatively, the inverse of the signal value output by the chosen infrared light detectors can be subtracted from the inverse of the signal values of all the other infrared light detectors. It is preferred that in step b) only one of the infrared light detectors is chosen. In this manner, fluctuations of the intensity of the infrared light emitted by the at least one infrared light source can be effectively compensated. It is hereby preferred that a plurality of the infrared light sources is provided and that the chosen infrared light detector is impinged by the infrared light of all the infrared light sources. In this manner, it is possible to compensate the fluctuations of the intensity of the infrared light emitted by a multitude of the infrared light sources by only one of the chosen infrared light detectors.

For both alternatives, i.e. the subtraction of the signal values or the subtraction of the inverse of the signal values, it is alternatively preferred that in step b) a plurality of the infrared light detectors is chosen and that the method comprises the step: e1) generating a wavelength dependent function using the electrical signals of a multitude of the chosen infrared light detectors; wherein in step f) the electrical signals of all the other infrared light detectors are corrected by using the wavelength dependent function. For the case that the signal values are subtracted, the wavelength dependent function is generated by fitting the wavelength dependent function to the signal values output by the chosen infrared light detectors and the wavelength dependent function is subtracted from the signal values output by all the other infrared light detectors. For the case that the inverse of the signal values are subtracted, the wavelength dependent function is generated by fitting the wavelength dependent function to the inverse of the signal values output by the chosen infrared light detectors and the wavelength dependent function is subtracted from the inverse of the signal values output by all the other infrared light detectors. It is therefore advantageously achieved that spectral shifts of the infrared light emitted by the infrared light sources can be compensated.

It is hereby preferred that at least one of the chosen infrared light detectors is one of the infrared light detectors of the line array and at least one of the chosen infrared light detectors is one of the single infrared light detectors, wherein the wavelength filter corresponding to the at least one of the chosen infrared light detectors has a transmission in a wavelength region that is outside of the spectrum that can be measured by the line array. It is thereby possible to correct for the effect of scattering with a particular high precision.

It is preferred that in step b) extinction spectra with different concentrations of the sample or of a reference sample being similar to the sample are measured, in particular by means of an FTIR spectrometer, and the wavelength regions where the sample has substantially no absorption are identified as these parts of the extinction spectra that have a smaller dependence on the concentration than its adjacent parts. For example, if the sample comprises ethanol and water and the ethanol concentration in the sample is supposed to be determined, it is sufficient to measure any reference sample comprising ethanol and water since different ethanol concentrations will merely result in different absolute intensities but not in spectral shifts in the extinction spectrum.

For identifying these parts of the extinction spectra that have a smaller dependence on the concentration than its adjacent parts, it is for example conceivable to form the derivative of the extinction spectra with respect to the concentration and then to identify local minima in this so formed spectrum.

Alternatively, it is conceivable to use chemometric methods. For the chemometric methods, windows of the extinction spectra, for example windows in the shape of Gaussians, are selected starting from one end of the extinction spectra to the other end of the extinction spectra and these windows are subtracted in iterations of the concentration. These corrected spectra are then passed through a partial least square (PLS) regression and the root mean square of standard error (RMSE) and $R^2$ of the measured versus predicted concentrations are obtained. The best $R^2$, i.e. being closest to 1, and the corresponding windows are chosen for the wavelength regions where the sample has substantially no absorption.

It is preferred that the FTIR spectrometer has a spectral resolution of at least 5 cm$^{-1}$, in particular at least 1 cm$^{-1}$. With this high spectral resolution it is particular easy to identify the wavelength region in the extinction spectrum where the sample has substantially no absorption. It is furthermore preferred that the extinction spectrum covers a spectral range from 2 μm to 20 μm. The FTIR spectrometer is further advantageous since it has powerful infrared light source that ensures that the infrared light penetrates the sample or the reference sample.

It is preferred that in step a) the inventive or one of the preferred ATR spectrometers is provided.

In the following the invention is explained on the basis of schematic drawings.

Figure 2:
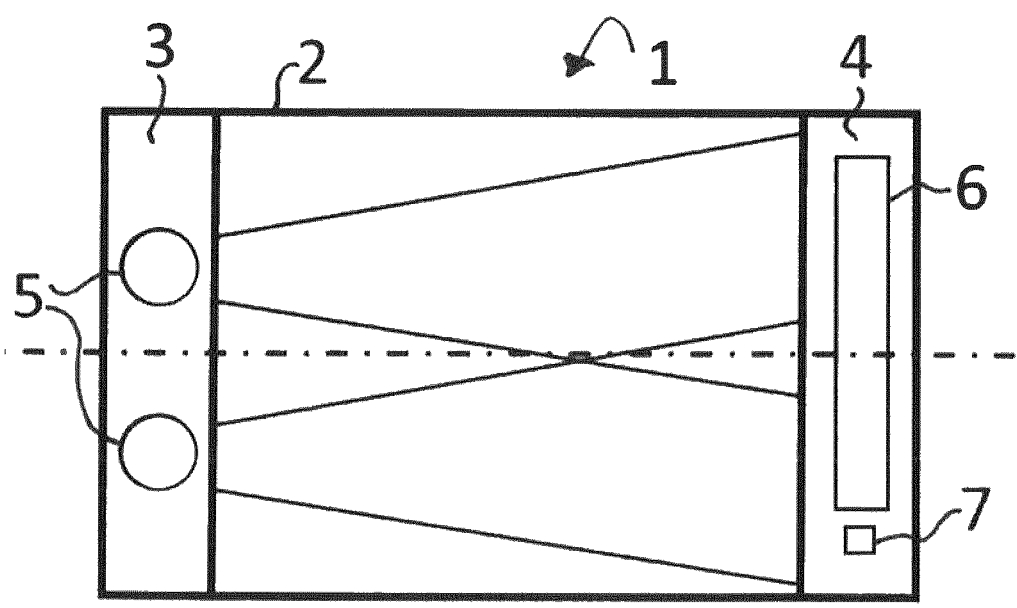
Figure 3:
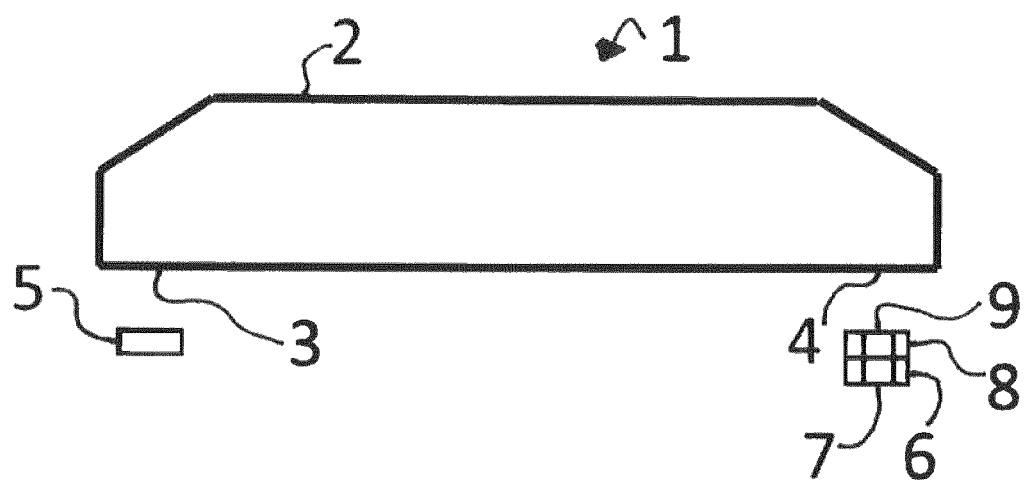
Figure 4:
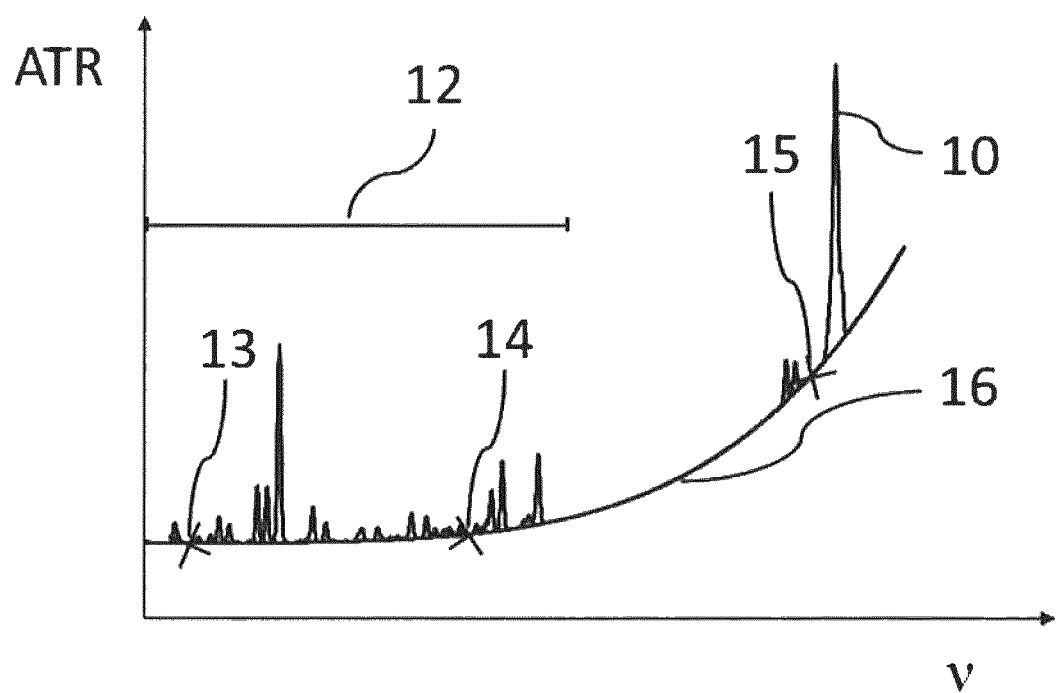
Figure 5:
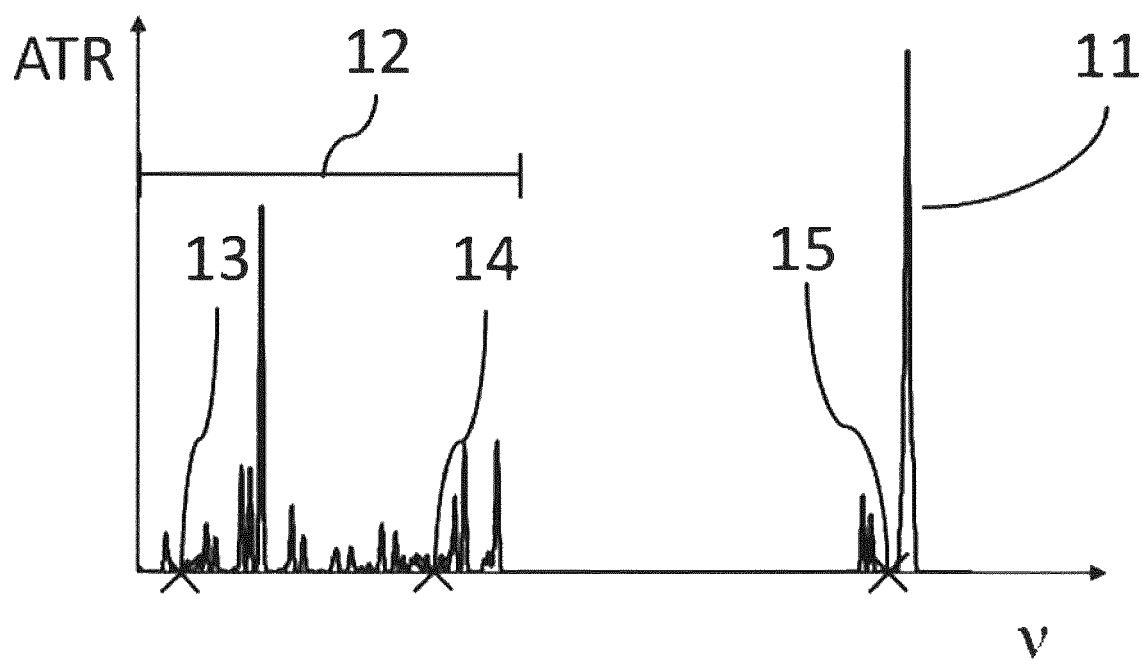

FIG. 1 shows a top view of a first embodiment of the ATR spectrometer according to the invention, FIG. 2 shows a top view of a second embodiment of the ATR spectrometer according to the invention, FIG. 3 shows a side view of both embodiments of the ATR spectrometer according to the invention, FIG. 4 shows an ATR spectrum before a correction, and FIG. 5 shows the ATR spectrum after the correction.

As it can be seen in FIGS. 1 to 3, an ATR spectrometer 1 for analysing the chemical composition of a sample comprises an ATR crystal 2, at least one infrared light source 5, a line array 6 of infrared light detectors and at least one single infrared light detector 7. FIGS. 1 and 2 show that the at least one single infrared light detector 7 and the line array 6 are arranged separately from each other with a space being arranged between the line array 6 and the single infrared light detector 7. In case a plurality of the single infrared light detectors 7 is provided, a further space can be provided between neighboured single infrared light detectors 7. The ATR crystal 2 has an entry surface 3 being immediately arranged on an entry end of the ATR crystal 2 and an exit surface 4 being immediately arranged on an exit end of the ATR crystal 2, wherein the exit end is arranged opposite to the entry end. The at least one infrared light source 5 is arranged on the entry surface 3. The line array 6 of the infrared light detectors and the single infrared light detector 7 are arranged on the exit surface 4.

In order to analyse the chemical composition of the sample, the sample is to be arranged immediately adjacent to the ATR crystal 2 so that the sample is in contact with the surface of the ATR crystal 2 facing away the entry surface 3 and the exit surface 4 as well as being arranged parallel to the entry surface 3 and the exit surface 4 (see FIG. 3).

The at least one infrared light source 5 is adapted to emit infrared light that enters the ATR crystal 2 via the entry surface 3, exits the ATR crystal 2 via the exit surface 4, and is guided to the infrared light detectors, i.e. to the line array 6 and to the at least one single infrared light detector 7, under total internal reflection and under interaction with the sample. The infrared light is guided from the exit surface 4 without a redirection, i.e. without that the infrared light changes its direction, to the infrared light detectors. FIG. 3 shows that a wavelength dispersive element 8 is arranged in the path of the infrared light from the exit surface 4 to the line array 6 so that the line array 6 is adapted to measure a spectrum of the infrared light. The wavelength dispersive element can for example be a prism, a grating and/or a linear variable filter. A wavelength filter 9 is arranged in the path of the infrared light from the exit surface 4 to the single infrared light detector 7. In case a plurality of the single infrared light detectors 7 is provided, a respective wavelength filter 9 is provided for each of the single infrared light detectors 7, wherein each of the wavelength filters 9 has a different wavelength dependent transmission.

The infrared light detectors are adapted to output an electrical signal being indicative of the amount of the infrared light impinging on the respective infrared light detector. The electrical signal can for example be an electrical current or an electrical voltage. The electrical signal is usually higher as the amount of light impinging on the respective infrared light detector increases. At least one of the infrared light detectors is chosen to be a chosen infrared light detector for a signal correction. The ATR spectrometer 1 is adapted to use the electrical signal of the chosen infrared light detectors to correct the electrical signals of all the other infrared light detectors.

FIG. 1 shows a first embodiment for the ATR spectrometer 1. In the first embodiment, only one infrared light source 5 is provided that has a sufficiently large divergence angle in order to illuminate the complete line array 6 and all the single infrared light detectors 7. FIG. 2 shows a second embodiment for the ATR spectrometer 1. In the second embodiment, two of the infrared light sources 5 are provided, wherein each of the infrared light detectors is irradiated by at least one of the two infrared light sources 5. In case only one of the chosen infrared light detectors is provided, this chosen infrared light detector is arranged in a location where it is irradiated by the both infrared light sources 5.

FIGS. 4 and 5 illustrate how the electrical signals of the chosen infrared light detectors can be used to correct the electrical signals of all the other infrared light detectors. FIG. 4 shows an ATR spectrum 10 before a correction and FIG. 5 shows an ATR spectrum 11 after the correction. For determining the ATR spectrum 10 before the correction, the inverse of all the electrical signals is used and in case of FIG. 4 plotted versus the frequency v. FIGS. 4 and 5 also show the wavelength range 12 of the spectrum that can be measured by the line array 6.

The ATR spectrometer 1 is adapted to use the electrical signals of a plurality of the chosen infrared light detectors to generate a wavelength dependent function 16 and to correct the electrical signals of all the other infrared light detectors using the wavelength dependent function 16.

At least one of the chosen infrared light detectors is one of the infrared light detectors of the line array 6. In the case of FIGS. 4 and 5 two of the chosen infrared light detectors are chosen from the line array 6. At least one of the chosen infrared light detectors is one of the single infrared light detectors 7. In the case of FIGS. 4 and 5, only one of the single infrared light detectors is one of the chosen infrared light detectors. Consequently, according to FIGS. 4 and 5, the ATR spectrometer 1 comprises three of the chosen infrared light detectors. The wavelength filter 9 corresponding to one of the chosen infrared light detectors, namely the single infrared light detector 7, is a bandpass filter and has a transmission in a wavelength region that is outside of the spectrum that can be measured by the line array 6 (see FIGS. 4 and 5).

The chosen infrared light detectors are chosen such that their corresponding detectable wavelength ranges are in wavelength regions where the sample has substantially no absorption. Since the ATR spectrometer 1 has three of the chosen infrared light detectors, the ATR spectrometer 1 is adapted to measure three different wavelength regions in the ATR spectrum with substantially no absorption. As it can be seen in FIGS. 4 and 5, a first wavelength region 13 corresponds to one of the two chosen infrared light detectors of the line array 6, a second wavelength region 14 corresponds to the other one of the two chosen infrared light detectors of the line array 6 and a third wavelength region 15 corresponds to the one single infrared light detector 7.

For choosing the wavelength regions, it is conceivable to measure an extinction spectrum of the sample or of a reference sample being similar to the sample by means of an FTIR spectrometer. The wavelength regions with substantially no absorption can then be determined from the extinction spectrum.

The ATR spectrometer 1 is adapted to fit the wavelength dependent function 16 to the inverse of the signal values output by the chosen infrared light detectors. The wavelength dependent function 16 according to FIG. 3 has the form $y(v)=a+b*\exp(c*v)$, with a, b, and c being parameters of the wavelength dependent function 16. Since three points of the wavelength dependent function 16 are determined by the three chosen infrared light detectors, the function y is unambiguously determined. But other forms for the wavelength dependent function 16 are also conceivable. After the wavelength dependent function 16 is derived, the wavelength dependent function is subtracted from the ATR spectrum 10 of FIG. 4. The subtraction results in the ATR spectrum 11 of FIG. 5. In this manner, spectral drifts of the at least one infrared light source 5 can be compensated and simultaneously the contribution of scattering can be eliminated from the ATR spectrum 10.

The chemical composition of the sample can then be analysed by applying Lambert-Beer's law to at least one part of the spectrum 11 after the correction and/or by applying chemometric methods to the spectrum 11 after the correction.

LIST OF REFERENCE SIGNS

1 ATR spectrometer
2 ATR crystal
3 entry surface
4 exit surface
5 infrared light source
6 line array
7 single infrared light detector
8 wavelength dispersive element
9 wavelength filter
10 ATR spectrum before correction
11 ATR spectrum after correction
12 wavelength range of line array
13 first wavelength region
14 second wavelength region
15 third wavelength region
16 wavelength dependent function

The invention claimed is:

1. An ATR spectrometer for analysing the chemical composition of a sample, wherein the ATR spectrometer comprises:
   an ATR crystal having an entry surface being immediately arranged on an entry end of the ATR crystal and an exit surface being immediately arranged on an exit end of the ATR crystal which is arranged opposite to the entry end;
   at least one infrared light source being arranged on the entry surface;
   a line array of infrared light detectors being arranged on the exit surface;
   at least one additional infrared light detector, separate from the line array, being arranged on the exit surface; and
   wherein the at least one infrared light source is adapted to emit infrared light that enters the ATR crystal via the entry surface and is guided to the infrared light detectors in the line array and to the at least one additional infrared light detector under total internal reflection and under interaction with the sample being arranged immediately adjacent to the ATR crystal;

wherein the ATR spectrometer additionally comprises a wavelength dispersive element being arranged in the path of the infrared light from the exit surface to the line array so that the line array is adapted to measure a spectrum of the infrared light; and a wavelength filter being arranged in the path of the infrared light from the exit surface to the at least one additional infrared light detector;

wherein the infrared light detectors in the line array and the at least one additional infrared light detector are each adapted to output an electrical signal being indicative of the amount of the infrared light impinging on the respective infrared light detector;

wherein at least one infrared light detector, in a group of infrared light detectors consisting of (1) the infrared light detectors in the line array and (2) the at least one additional infrared light detector, is chosen to be a chosen infrared light detector for a signal correction, and the ATR spectrometer is adapted to use the electrical signal of the at least one chosen infrared light detectors to correct the electrical signals of all the other infrared light detectors in the group of infrared light detectors.

2. The ATR spectrometer according to claim 1, wherein the sample is arranged immediately adjacent to the ATR crystal and each chosen infrared light detector is chosen such that its corresponding detectable wavelength range is in a wavelength region where the sample has substantially no absorption.

3. The ATR spectrometer according to claim 1, wherein each additional infrared light detector has a larger photoactive surface than each of the infrared light detectors in the line array.

4. The ATR spectrometer according to claim 1, wherein the wavelength filter is a bandpass filter.

5. The ATR spectrometer according to claim 4, wherein the spectral resolution for at least one of the at least one additional infrared light detector is higher than for all of the infrared light detectors M the line array.

6. The ATR spectrometer according to claim 1, wherein each chosen infrared light detector is wired with all the other infrared light detectors of the group of infrared light detectors such that during operation of the ATR spectrometer the electrical signals output by each chosen infrared light detector is subtracted from the electrical signals output by all the other infrared light detectors in the group of infrared light detectors.

7. The ATR spectrometer according to claim 1, wherein a plurality of infrared light detectors in the group of infrared light detectors are chosen to be chosen infrared light detectors for signal correction, wherein the ATR spectrometer is adapted to use the electrical signal of the plurality of chosen infrared light detectors to generate a wavelength dependent function and to correct the electrical signals of all the other infrared light detectors of the group of infrared light detectors using the wavelength dependent function.

8. The ATR spectrometer according to claim 7, wherein:
at least one of the chosen infrared light detectors is one of the infrared light detectors in the line array; and
at least one of the chosen infrared light detectors is one of the at least one additional infrared light detector, wherein the wavelength filter corresponding to the chosen infrared light detector in the at least one additional infrared light detector has a transmission in a wavelength region that is outside of the spectrum that can be measured by the line array.

9. A method for analysing the chemical composition of a sample, the method comprising the steps:
providing an ATR spectrometer comprising:
an ATR crystal having an entry surface being immediately arranged on an entry end of the ATR crystal and an exit surface being immediately arranged on an exit end of the ATR crystal which is arranged opposite to the entry end;
at least one infrared light source being arranged on the entry surface;
a line array of infrared light detectors being arranged on the exit surface;
at least one additional infrared light detector, separate from the line array, being arranged on the exit surface;
wherein the at least one infrared light source is adapted to emit infrared light that enters the ATR crystal via the entry surface and is guided to the infrared light detectors in the line array and to the at least one additional infrared light detector under total internal reflection and under interaction with the sample being arranged immediately adjacent to the ATR crystal;
wherein the ATR spectrometer additionally comprises a wavelength dispersive element being arranged in the path of the infrared light from the exit surface to the line array so that the line array is adapted to measure a spectrum of the infrared light; and
a wavelength filter being arranged in the path of the infrared light from the exit surface to the at least one additional infrared light detector;
choosing at least one infrared light detector, in a group of infrared light detectors consisting of (1) the infrared light detectors in the line array and (2) the at least one additional infrared light detector, is to be a chosen infrared light detector such that each chosen infrared light detector's corresponding detectable wavelength range is in a wavelength region where the sample has substantially no absorption;
arranging the sample immediately adjacent to the ATR crystal;
emitting the infrared light by the at least one infrared light source;
outputting a respective electrical signal by each of the infrared light detectors in the group of infrared light detectors, wherein each of the electrical signals is indicative of the amount of the infrared light impinging on the respective infrared light detector; and
correcting with the electrical signal of each chosen infrared light detectors the electrical signals of all the other infrared light detectors in the group of infrared light detectors.

10. The method according to claim 9, wherein in the choosing step, only one infrared light detector is chosen.

11. The method according to claim 10, wherein a plurality of the infrared light sources is provided and wherein the chosen infrared light detector is impinged by the infrared light of all the infrared light sources.

12. The method according to claim 9, wherein in the choosing step, more than one infrared light detectors are chosen, the method further comprising the step:

generating a wavelength dependent function using the electrical signals of a multitude of the more than one chosen infrared light detectors;

wherein in the correcting step the electrical signals of all the other infrared light detectors in the group of infrared light detectors are corrected by using the wavelength dependent function.

13. The method according to claim 12, wherein at least one of the chosen infrared light detectors is one of the infrared light detectors of the line array and at least one of the chosen infrared light detectors is one of the at least one additional infrared light detector, wherein the wavelength filter corresponding to the chosen infrared light detector in the at least one additional infrared light detector has a transmission in a wavelength region that is outside of the spectrum that can be measured by the line array.

14. The method according to claim 9, wherein in the choosing step extinction spectra with different concentrations of the sample or of a reference sample being similar to the sample are measured by an FTIR spectrometer, and the wavelength regions where the sample has substantially no absorption are identified as parts of the extinction spectra that have a smaller dependence on the concentration than its adjacent parts.

15. The method according to claim 9, wherein each of the at least one additional infrared light detector has a larger photoactive surface than each of the infrared light detectors of the line array.

* * * * *